(12) United States Patent
Singh (10) Patent No.: US 9,140,044 B2
(45) Date of Patent: Sep. 22, 2015

(54) DUAL-OPENING ARMREST ASSEMBLY AND VEHICLE HAVING SAME (71) Applicant: GM GLOBAL TECHNOLOGY OPERATIONS LLC, Detroit, MI (US)

(72) Inventor: Gurnek Singh, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 75 days.

(21) Appl. No.: 13/912,511

(22) Filed: Jun. 7, 2013

(65) Prior Publication Data

US 2014/0361567 A1    Dec. 11, 2014

(51) Int. Cl.
*E05D 7/02* (2006.01)
*B60N 2/46* (2006.01)
*B60R 7/04* (2006.01)
*E05D 15/50* (2006.01)

(52) U.S. Cl.
CPC ................ *E05D 7/02* (2013.01); *B60N 2/4686* (2013.01); *B60R 7/04* (2013.01); *E05D 15/502* (2013.01)

(58) Field of Classification Search
CPC .......... B60N 2/4686; B60R 7/04; E05D 7/02; E05D 15/502
USPC ................... 296/24.34, 24.46, 37.8
See application file for complete search history.

(56) References Cited

U.S. PATENT DOCUMENTS

2007/0046058 A1* 3/2007 Busha et al. ............... 296/37.8
2009/0200825 A1* 8/2009 Shimajiri ................... 296/37.8

* cited by examiner

*Primary Examiner* — Glenn Dayoan
*Assistant Examiner* — Melissa A Black
(74) *Attorney, Agent, or Firm* — Quinn Law Group, PLLC (57) ABSTRACT

An assembly for a vehicle includes a bin defining a compartment with an access opening. A lid at least partially covers the access opening when in a closed position. A single cross bar is adjacent the lid. The cross bar is pivotably attached to the bin near a first end of the cross bar and is pivotably attached to the lid near a second end of the cross bar. Latching mechanisms releasably latch the lid to the bin and the single cross bar. The lid is releasably latched only to the bin and the single cross bar. The lid is pivotable in a first direction to a first open position, and is alternately pivotable in a second direction to a second open position. A first biasing mechanism biases the lid to the first open position. A second biasing mechanism biases the lid to the second open position.

20 Claims, 9 Drawing Sheets

DUAL-OPENING ARMREST ASSEMBLY AND VEHICLE HAVING SAME

TECHNICAL FIELD

The present teachings generally include an armrest assembly for a vehicle.

BACKGROUND

Vehicle armrests are provided in most automotive vehicles for the comfort of passengers. An armrest assembly is often provided between the driver's seat and the front passenger's seat. Such an armrest assembly can be used by either the driver or an occupant of the front seat. Sometimes the armrest assembly has a lid that opens to allow access to a storage compartment. The lid is sometimes assisted by a biasing spring to achieve an open position. Known armrest assemblies with such spring-assisted opening that can be pivoted open by the driver toward the passenger, or alternately by the passenger toward the driver require cross bars both forward and rearward of the pivotable lid in order for the lid to latch to the cross bars. While suitable for their intended purposes, the cross bars of such armrest assemblies take up space, and limit options for other functions of the armrest assembly.

SUMMARY

An assembly for a vehicle includes a bin defining a compartment with an access opening. A lid is configured to at least partially cover the access opening when in a closed position. A single cross bar is adjacent the lid. The cross bar is pivotably attached to the bin near a first end of the cross bar and is pivotably attached to the lid near a second end of the cross bar. Latching mechanisms releasably latch the lid to the bin and the single cross bar. The lid is releasably latched only to the bin and the single cross bar. Stated differently, the lid is not releasably latched to any components other than the bin and the single cross bar. The latching mechanisms are configured so that the lid is pivotable in a first direction to a first open position that at least partially uncovers the access opening, and is alternately pivotable is a second direction to a second open position that at least partially uncovers the access opening. A first biasing mechanism biases the lid to the first open position. A second biasing mechanism biases the lid to the second open position. While the assembly may be an armrest assembly, it could instead be another type of compartment assembly within the scope of the claimed invention.

Because the lid and bin are configured so that each of the latching mechanisms latch the lid only to the bin or only to the bin and the single cross bar, an additional cross bar forward of the lid is not required. The portion of the bin forward of the lid is thus unobstructed, and can be used to accommodate other features, such as a support surface for inductive charging of a key fob or a phone.

The above features and advantages and other features and advantages of the present teachings are readily apparent from the following detailed description of the best modes for carrying out the present teachings when taken in connection with the accompanying drawings.

DETAILED DESCRIPTION

Figure 1:
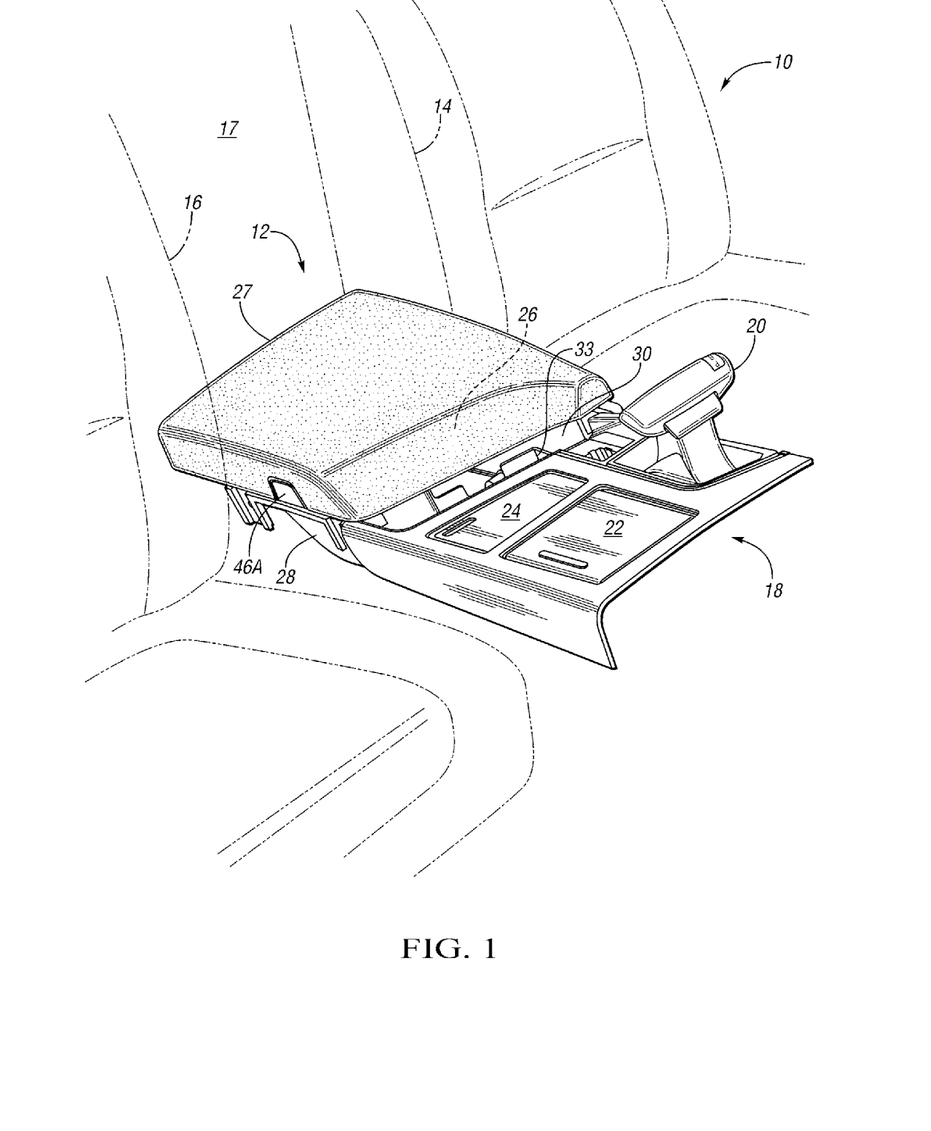
FIG. 1 is a schematic perspective fragmentary illustration of a portion of a vehicle showing an armrest assembly with a lid in a closed position.

Referring to the drawings, wherein like reference numbers refer to like components throughout the several views, FIG. 1 shows a portion of a vehicle 10 that includes an armrest assembly 12 positioned laterally between a driver's seat 14 and a passenger seat 16 in a passenger compartment 17 of the vehicle 10. The driver's seat 14 is also referred to herein as a first seat, and the passenger seat 16 is also referred to herein as a second seat. The armrest assembly 12 is integrated with a console assembly 18 that includes a gear shift 20. The console assembly 18 also has sliding panels 22, 24 that cover cup holders, touch screens, or other components.

Figure 2:
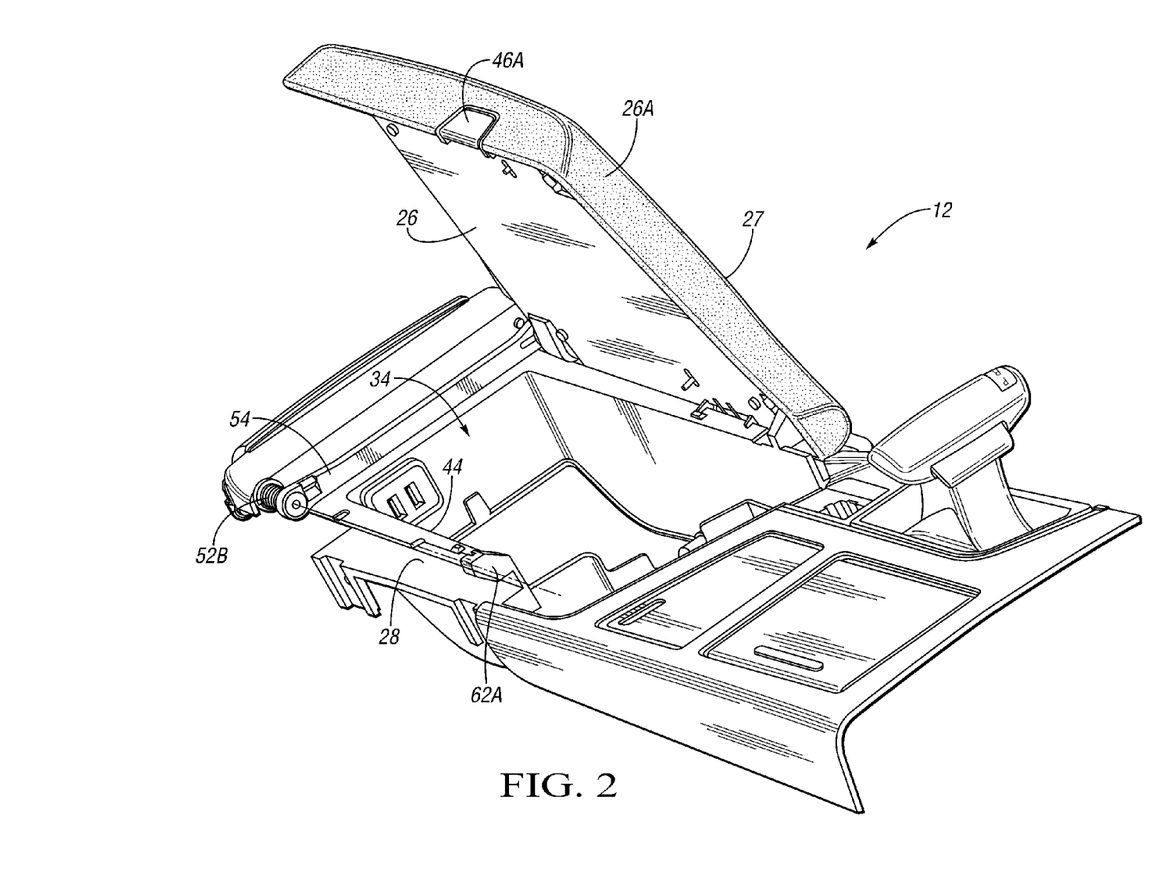
FIG. 2 is a schematic perspective illustration of the armrest assembly of FIG. 1 showing the lid in a first open position.
Figure 3:
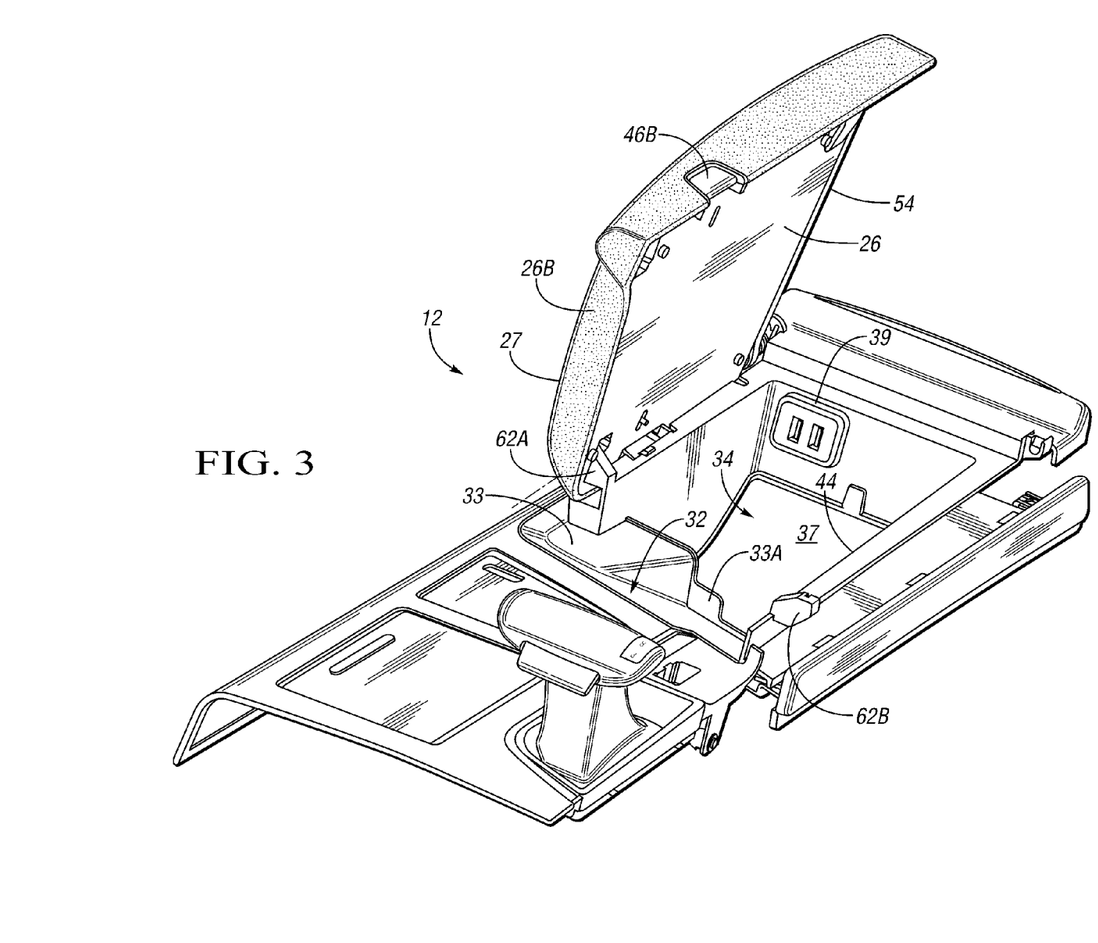
FIG. 3 is a schematic perspective illustration of the armrest assembly of FIG. 1 showing the lid in a second open position.

As further described herein, the armrest assembly 12 has a lid 26 that can be pivoted open from either side (i.e., from the driver's side adjacent driver's seat 14 or from the passenger's side adjacent passenger seat 16) to access a bin 28. The lid 26 is biased to the open positions of FIGS. 2 and 3, and yet the armrest assembly 12 does not have a cross bar forward of the lid 26, so that a slot 30 between the lid 26 and a support surface 32 of a liner 33 on the bin 28 is an unobstructed area. The support surface 32 is shown in FIG. 3. The unobstructed area 30 enables the support surface 32 to support a cell phone or other object such as for inductive charging. In FIGS. 1-3, the lid 26 is covered by a cushion 27. Another liner 37 lines the bottom of the bin 26. A USB charging module 39 is shown mounted to the bin 28 at an opening 31 (shown in FIG. 4) in the rear wall 40. The USB charging module 39 is accessible in the compartment 34 in FIG. 3.

Figure 4:
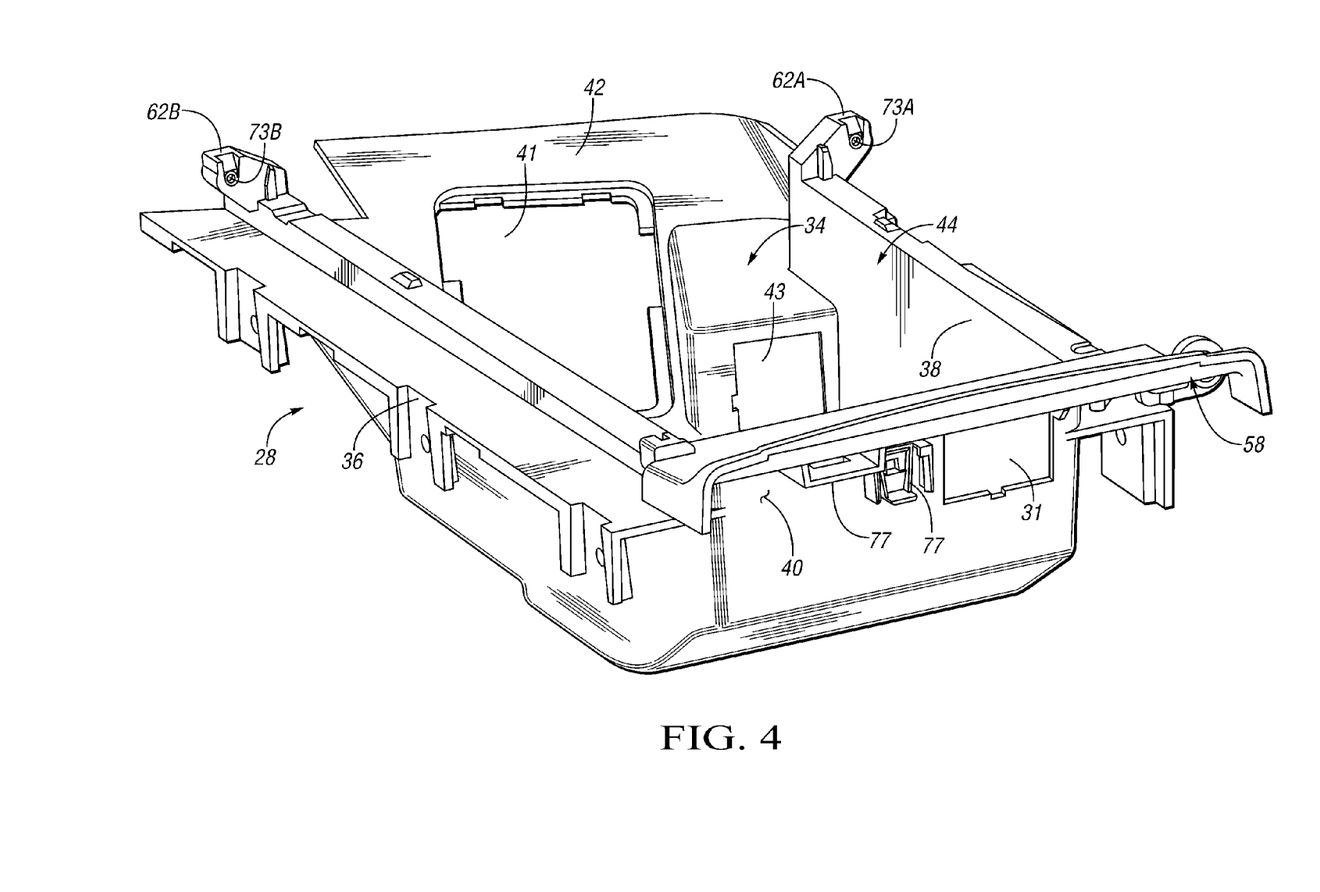
FIG. 4 is a schematic perspective illustration of a bin of the armrest assembly of FIG. 1.
Figure 9:
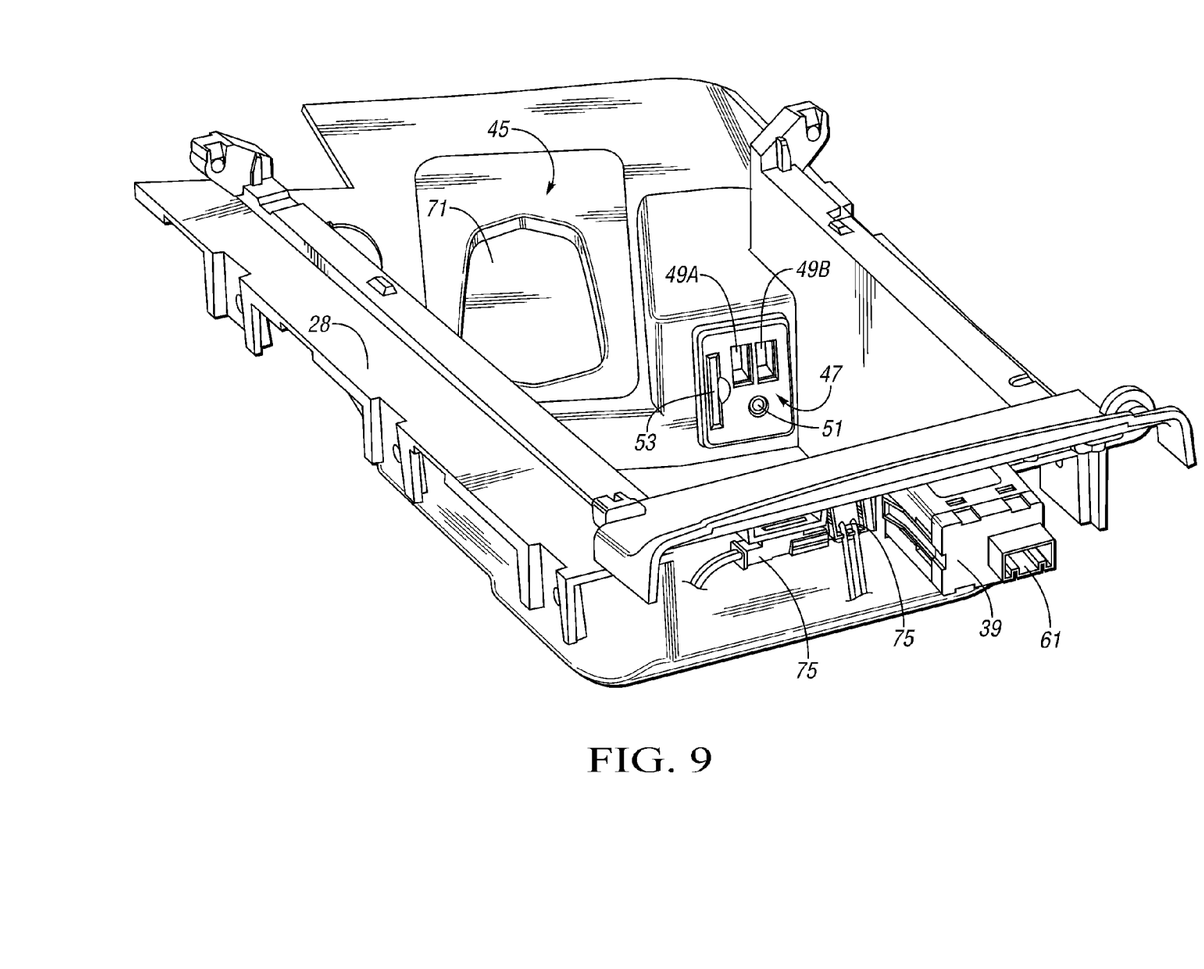
FIG. 9 is a schematic illustration of the bin of FIG. 4 with various components attached thereto.

FIG. 4 shows that the bin 28 forms a storage compartment 34 as defined by a driver's side wall 36, a passenger side wall 38, a rear wall 40 and a front wall 42. The bin 28 is open at the top. That is, the bin 28 has an access opening 44 with a perimeter defined by the upper extent of the walls 36, 38, 40, 42. Both the lid 26 and the bin 28 can be molded plastic components, allowing each to be a unitary component and achieve the complex shapes described herein. The front wall 42 is substantially covered by the liner 33 in FIG. 3. A first opening 41 and a second opening 43 are formed in the front wall of the bin 28. The first opening 41 is configured to allow an inductive coil charging module (ICCM) 45 shown in FIGS. 9 and 10 to be supported by the bin 28 at the first opening 41. The ICCM 45 is covered by the liner 33 in FIG. 1. A phone or other small chargeable device can be rested on the liner 33 above the ICCM 45 to be charged by the ICCM 45. The liner 33 and the slot 30 can be referred to as a phone shrine. A ledge portion 33A of the liner 33 is best shown in FIG. 3, and prevents the charging object from sliding off of the liner 33. FIG. 9 shows a recess 71 that can contain a key FOB when the liner 33 is removed. This may allow a technician to run diagnostic tests on the vehicle 10 via the ICCM 45 and the key FOB.

Figure 10:
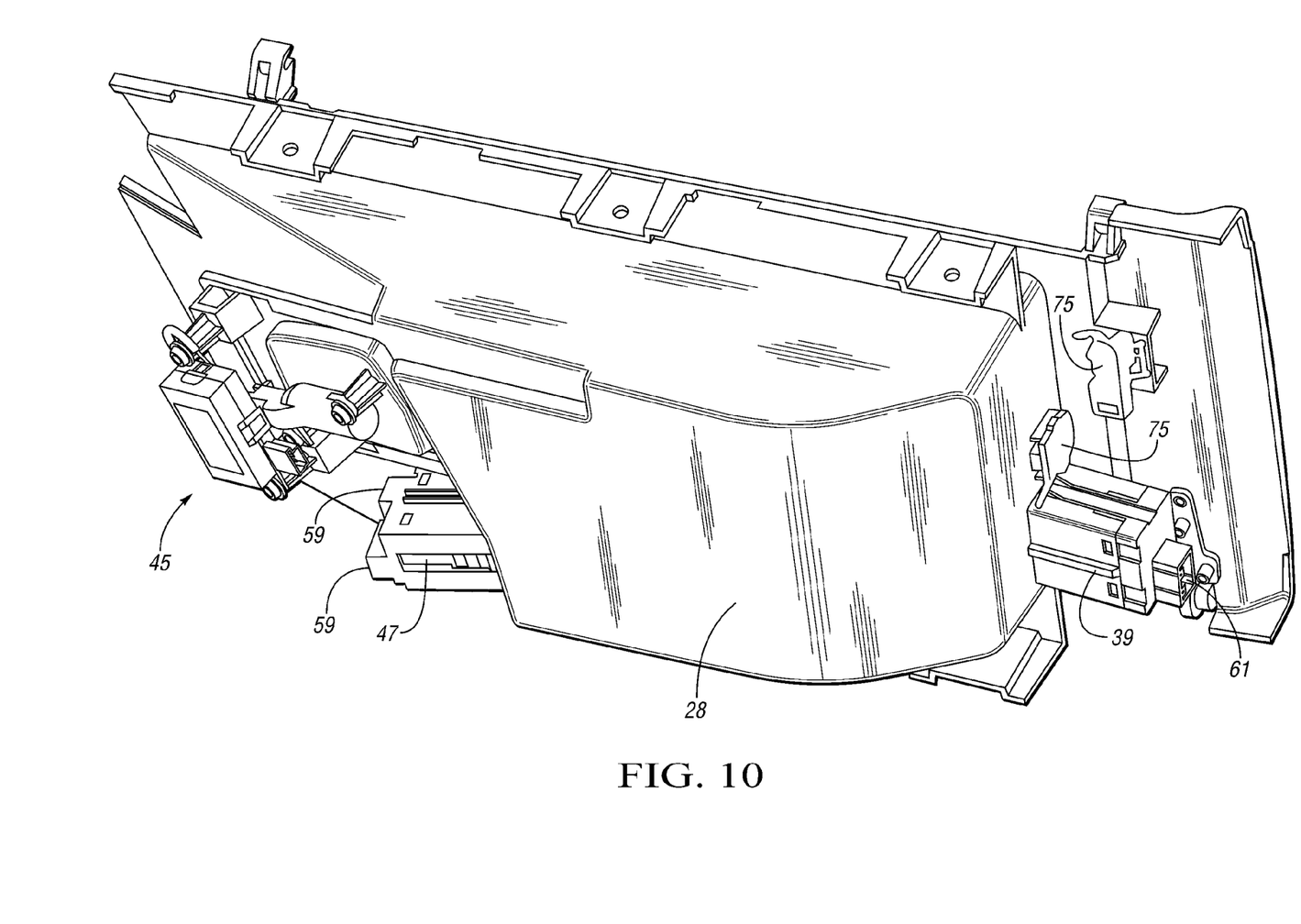
FIG. 10 is a schematic perspective illustration showing the bottom of the bin of FIG. 9.

The second opening 43 is configured to allow an accessory device module 47 to be supported by the bin 28. The accessory device module 47 includes two USB ports 49A, 49B, an auxiliary device port 51, and an SD card port 53. Electrical connection ports 59 that connect the accessory device module 47 to other vehicle components such as an audio system, video system, or other media system are shown in FIG. 10. A power connection port 61 for the USB charger 39 is shown in FIG. 10. Lamp connectors 75 for lighting the bin 28 are also visible in FIGS. 9 and 10 and are mounted to the bin 28 at mounts 77 shown in FIG. 4.

In FIG. 1, the lid 26 is in a closed position and is completely covered by the cushion 27. In the closed position, the lid 26 is latched to the bin 28, as further explained herein, and substantially closes the compartment 34 by covering the access opening 44. The lid 26 can be easily opened from the passenger seat 16 by depressing a push button 46A, which unlatches the lid 26 and causes the lid 26 to pivot in a first direction (counterclockwise when looking forward in the vehicle 10) to a first open position 26A of FIG. 2. Alternatively, the lid 26 can be easily opened from the driver's seat 14 by depressing a push button 46B, which unlatches the lid 26 and causes the lid 26 to pivot in a second direction (clockwise when looking forward in the vehicle 10) to a second open position 26B of FIG. 3. In the open positions 26A, 26B, the access opening 44 is substantially uncovered, allowing access to the compartment 34.

Figure 5:
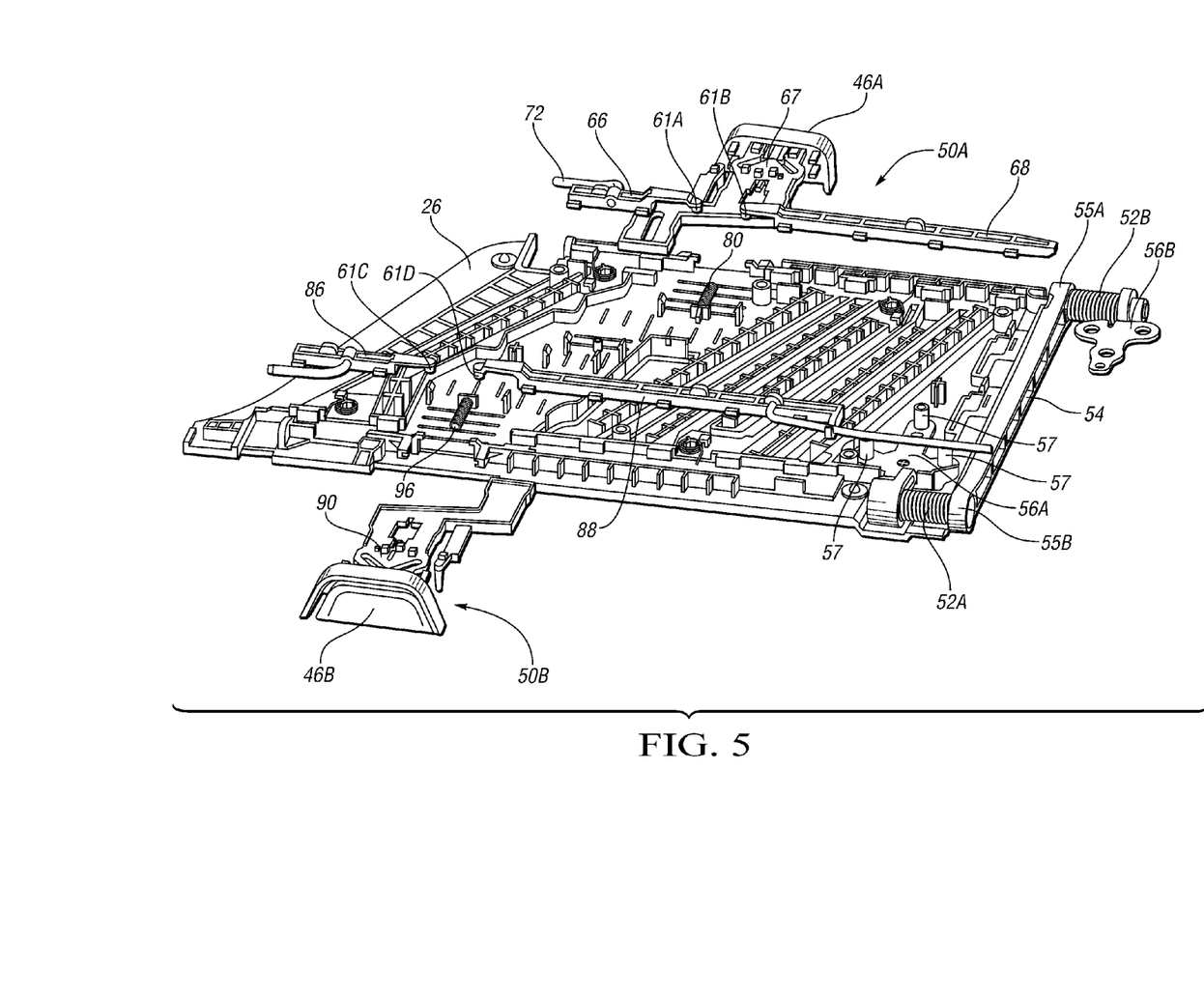
FIG. 5 is a schematic perspective illustration in exploded view of a lid, cross bar, and latching mechanisms of the armrest assembly of FIG. 1.
Figure 6:
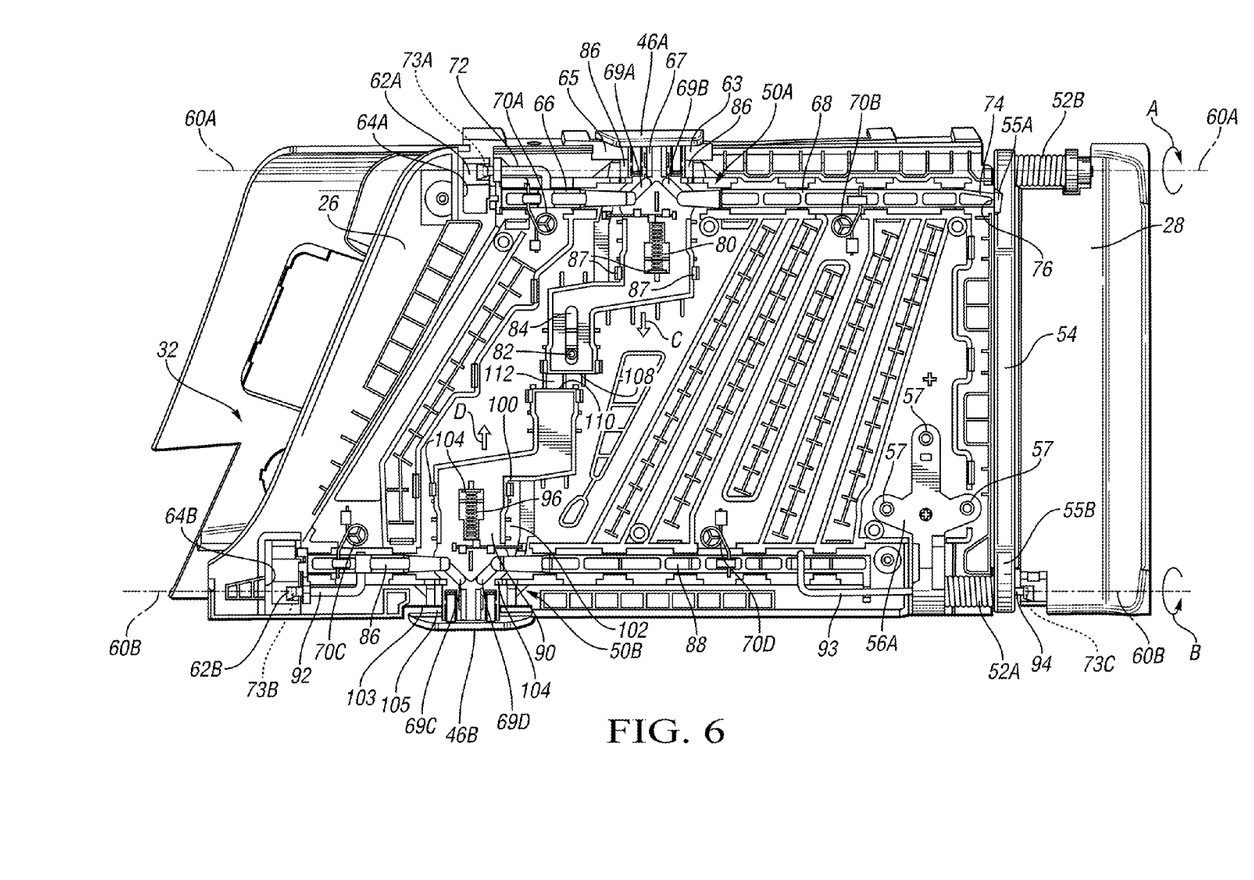
FIG. 6 is a schematic illustration in plan view of the armrest assembly of FIG. 1 with a covering removed to show the latching mechanisms of FIG. 5.

FIGS. 5 and 6 show the lid 26 with first and second latching mechanisms 50A, 50B, first and second biasing mechanisms 52A, 52B, and a cross bar 54 operatively connected with the lid 26. The cross bar 54 is adjacent the lid 26, immediately rearward of the lid 26. The cross bar 54 is pivotably attached to the bin 28 near a first end 55A of the cross bar 54, and is pivotably attached to the lid 26 near a second end 55B of the cross bar 54. Specifically, the cross bar 54 is pivotably attached to the lid 26 by the first biasing mechanism 52A, which has one end fixed to the cross bar 54 and another end fixed to a first bracket 56A that is attached to the lid 26 at molded heat stakes 57. In other words, the first biasing mechanism 52A is operatively secured to the cross bar 54 and to the lid 26. The first biasing mechanism 52A is a torsion spring that urges the lid 26 to pivot about a second pivot axis 60B in the direction of arrow B, referred to herein as a first direction.

The cross bar 54 is pivotably attached to the bin 28 by the second biasing mechanism 52B, which has one end fixed to the cross bar 54 and another end fixed to a second bracket 56B that is fixed to an underside 58 of the bin 28 shown in FIG. 4. Stated differently, the second biasing mechanism 52B is operatively secured to the cross bar 54 and the bin 28. The second biasing mechanism 52B is a torsion spring that urges the lid 26 to pivot about a first pivot axis 60A in the direction of arrow A, referred to herein as a second direction. The cross bar 54 is the only cross bar in the armrest assembly 12. That is, as shown in FIG. 5, no other components connected with either of the latching mechanisms 50A, 50B span the lid 26. Although the biasing mechanisms 52A, 52B are torsion springs in the embodiment shown, other suitable biasing mechanisms can be used.

The bin 28 has a first extension 62A and a second extension 62B that extend upward from the walls 36 and 38 of the bin 28. The lid 26 has a first aperture 64A and a second aperture 64B extending through the lid 26. When the lid 26 is in the closed position, the extension 62A extends through the first aperture 64A, and the second extension 62B extends through the second aperture 64B, as shown in FIG. 6.

The first latching mechanism 50A is releasably latched to the bin 28 and to the cross bar 54. Specifically, the first latching mechanism 50A includes a first latch member 66 and a second latch member 68 both slidably fixed to the lid 26. As used herein, latch members are "slidably fixed" to the lid 26 when they can slide in a direction along their lengths, that is, parallel to the pivot axes 60A, 60B to latch or unlatch. The first latching mechanism 50A also includes a first striker 67 that controls movement of the latch members 66, 68 along the lid 26. The first striker 67 is configured with angled slots 69A, 69B. One end of the first latch 66 is configured to be captured in the slot 69A. One end of the second latch 68 is captured in the slot 69B. For example, the ends of the latches 66, 68 can each have a respective neck 61A, 61B sufficiently narrow to ride in the respective slot 69A, 69B, so that the latches 66, 68 are secured to the striker 67 at the slots 69A, 69B.

A torsion spring 70A connected to the lid 26 and the first latch member 66 biases the first latch member 66 to the latched position shown, in which an arm 72 of the first latch member 66 extends into a recess 73A of the first extension 62A to engage with the first extension 62A and latch to the bin 28. The recess 73A is indicated with hidden lines in FIG. 6. A torsion spring 70B biases the second latch member 68 to the latched position shown in which the second latch member 68 latches to the cross bar 54. That is, an end 74 of the second latch member 68 extends into a recess 76 in the cross bar 54. The torsion springs 70A, 70B also keep the latch members 66, 68 relatively flat along the lid 26, and provide some downward force, helping to keep the necks 61A, 61B shown in FIG. 5 in the slots 69A, 69B.

A spring 80 biases the striker 67 outward, and biases the push button 46A to an undepressed position, with the latch members 66, 68 at the bottom of the slots 69A, 69B, and the latching mechanism 50A latched as shown in FIG. 6. The lid 26 includes a slot post 82 captured in a slot 84 of the striker 67. The slot post 82 and slot 84 are included only on the first striker 67. A second striker 90, discussed below, cannot be installed in the position of first striker 67 as striker 90 has no slot and the slot post 82 would thus interfere with slot 84. Stoppers 87 that guide movement of the striker 67 in the direction of arrow C when the push button 46A is depressed. The push button 46A can be depressed until it contacts the side 63 of the lid 26 in the recess 65. The striker 67 moves laterally inward relative to the latch members 66, 68. This causes the angled slots 69A, 69B to move so that the captured necks 61A, 61B of the latch members 66, 68 move to the close ends of the slots 69A, 69B, with the latch members 66, 68 sliding inward toward the striker 67 a distance sufficient to simultaneously release from the extension 62A and the cross bar 54. Depression of the push button 46A causes this movement of the striker 67 and latch members 66, 68, and is sufficient to overcome the bias of the torsion springs 70A, 70B and the spring 80. Once the first and second latch members 66, 68 are released in this manner, the first biasing mechanism 52A urges the lid member 26 to pivot about the second pivot axis 60B to the open position 26A of FIG. 2. The first biasing mechanism 52A can be designed to have a sufficient biasing force to move the lid member 26 to the first open position 26A without any additional manual force, or the first biasing mechanism 52A can be designed to provide only some of the force needed to move the lid member 26, with additional manual force added. In either case the first biasing mechanism 52A can be referred to as a "spring-assist".

The second latching mechanism 50B is releasably latched only to the bin 28. Specifically, the second latching mechanism 50B includes a third latch member 86 and a fourth latch member 88 both slidably fixed to the lid 26. The second latching mechanism 50B also includes a second striker 90 that controls movement of the latch members 86, 88 along the lid 26. The second striker 90 is configured with angled slots 69C, 69D. A neck 61C at one end of the third latch member 86 is configured to be captured in the slot 69C. A neck 61D at one end of the fourth latch member 88 is captured in the slot 69D. The necks 61C, 61D are sufficiently narrow to ride in the respective slot 69C, 69D so that the latch members 86, 88 are secured to the striker 90 at the slots 69C, 69D.

A torsion spring 70C connected to the lid member 26 and the third latch member 86 biases the third latch member 86 to the latched position shown, in which an arm 92 of the first latch member 86 extends into a recess 73B of the second extension 62B to engage with the second extension 62B and latch to the bin 28. The recess 73B is indicated with hidden lines in FIG. 6. A torsion spring 70D biases the fourth latch member 88 to the latched position shown in which the fourth latch member 88 latches to the bin 28. The torsion springs 70C, 70D also keep the latch members 86, 88 relatively flat along the lid 26 and provide some downward force helping to keep the necks 61C, 61D in the slots 69C, 69D. That is, an end 94 of the fourth latch member 88 extends through the center of the biasing mechanism 52A to extend into a recess 73C in the bin 28 and latch to the bin 28.

Figure 7:
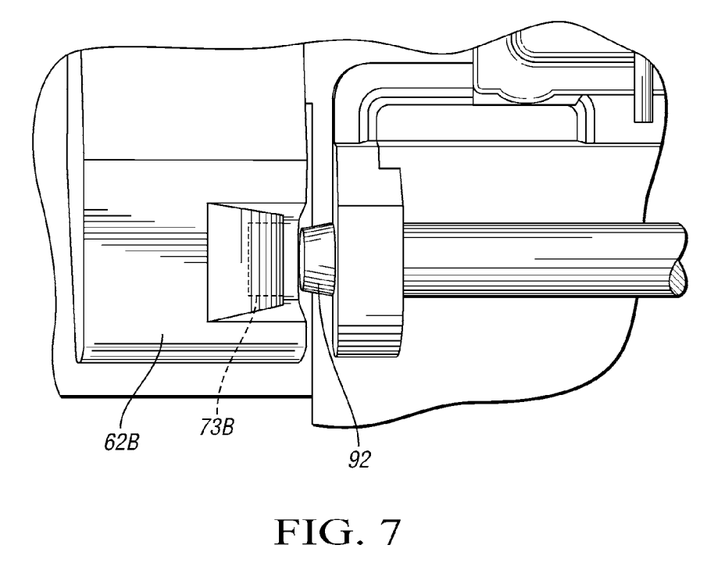
FIG. 7 is a schematic fragmentary illustration in plan view of a latch arm of the second latching mechanism of FIG. 6 released from the bin, and latched to the bin in phantom.
Figure 8:
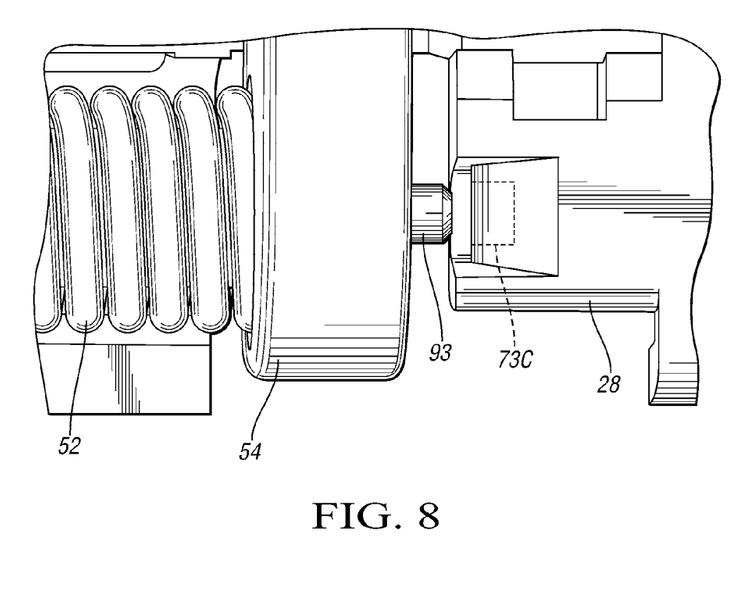
FIG. 8 is a schematic fragmentary illustration in plan view of another latch arm of the second latching mechanism of FIG. 6 released from the bin, and latched to the bin in phantom.

A spring 96 biases the striker 90 outward and biases the push button 46B outward to an undepressed position shown in FIG. 6, with the latch members 86, 88 at the bottom of the slots 69C, 69D, and the latching mechanism 50B latched. The lid 26 includes a guide 100 captured in a slot 102 of the striker 90 and stoppers 104 that guide movement of the striker 90 in the direction of arrow D when the push button 46B is depressed. The push button 46B can be depressed until it contacts the side 103 of the lid 26 in the recess 105. The striker 90 moves laterally inward relative to the latch members 86, 88, causing the angled slots 69C, 69D to move so that the captured ends of the latch members 86, 88 move to the close ends of the slots 69C, 69D, with the latch members 86, 88 sliding inward toward the striker 90 a distance sufficient to simultaneously release from the extension 62B and the bin 28 at the end 94. FIG. 7 shows the arm 92 released from the extension 62B. FIG. 8 shows an arm 93 of the latch member 88 released from the bin 28. Depression of the push button 46B causes this movement of the striker 90 and latch members 86, 88, and is sufficient to overcome the bias of the torsion springs 70C, 70D and the spring 96. Once the third and fourth latch members 86, 88 are released in this manner, the second biasing mechanism 52B urges the lid member 26 to pivot about the first pivot axis 60A to the open position 26B of FIG. 3. The second biasing mechanism 52B can be designed to have a sufficient biasing force to move the lid member 26 to the second open position 26B without any additional manual force, or the second biasing mechanism 52B can be designed to provide only some of the force needed to move the lid member 26, with additional manual force added. In either case the second biasing mechanism 52B can be referred to as a "spring-assist".

FIGS. 5 and 6 show that the strikers 67 and 90 have an irregular shape so that, even though the push buttons 46A, 46B are laterally offset from one another, the end 108 of striker 67 at least partially aligns with the end 110 of striker 90. A gap 112 that exists between the ends 108, 110 is traversed by the first striker 67 when the first push button 46A is depressed. Similarly, the gap 112 is traversed by the second striker 90 when the second push button 46B is depressed. Accordingly, the first striker 67 interferes with movement of the second striker 90 when the first striker 67 is moved, and the second striker 90 interferes with movement of the first striker 67 when the second striker 90 is moved. Because of this designed interference, the first latching mechanism 50A and the second latching mechanism 50B are only releasable one at a time. In other words, if the driver has released the second latching mechanism 50B to open the lid 26, the passenger cannot release the first latching mechanism 50A, and if the passenger has released the first latching mechanism 50A to open the lid 26, the driver cannot release the second latching mechanism 50B.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An assembly for a vehicle comprising:
a bin defining a compartment with an access opening;
a lid configured to at least partially cover the access opening when in a closed position;
a single cross bar adjacent the lid; wherein the single cross bar is pivotably attached to the bin near a first end of the single cross bar and is pivotably attached to the lid near a second end of the single cross bar;
a plurality of latching mechanisms releasably latching the lid to the bin and the single cross bar; wherein the lid is releasably latched only to the bin and the single cross bar;
wherein the latching mechanisms are configured so that the lid is pivotable relative to the single cross bar and the bin in a first direction to a first open position at least partially uncovering the access opening, and is alternately pivotable in a second direction with the single cross bar relative to the bin to a second open position at least partially uncovering the access opening;
a first biasing mechanism biasing the lid to the first open position; and
a second biasing mechanism biasing the lid to the second open position.

2. The assembly of claim 1, wherein the first biasing mechanism is a first torsion spring operatively secured to the single cross bar and the lid;
wherein the second biasing mechanism is a second torsion spring operatively secured to the single cross bar and to the bin.

3. The assembly of claim 1, wherein the plurality of latching mechanisms include a first latching mechanism and a second latching mechanism;
wherein the first latching mechanism has:
a first latch member slidably fixed to the lid and releasably latched to the bin;
a second latch member slidably fixed to the lid and releasably latched to the single cross bar;
a first striker engaged with the first latch member and with the second latch member and movable to simultaneously release the first and the second latch members from the bin and the single cross bar, respectively;
wherein the second latching mechanism has:
a third latch member slidably fixed to the lid and releasably latched to the bin;
a fourth latch member slidably fixed to the lid and releasably latched to the bin; and
a second striker engaged with the third latch member and with the fourth latch member and movable to simultaneously release the third and the fourth latch members from the bin.

4. The assembly of claim 3, wherein the first striker has angled slots; and wherein the first latch member and the second latch member move relative to one another in the angled slots when the first striker is moved.

5. The assembly of claim 3, wherein the first striker is configured to interfere with movement of the second striker when the first striker is moved; and
wherein the second striker is configured to interfere with movement of the first striker when the second striker is moved, the first latching mechanism and the second latching mechanism thereby being releasable only one at a time.

6. The assembly of claim 1, wherein the plurality of latching mechanisms include a first latching mechanism and a second latching mechanism;
wherein the lid has a first aperture adjacent the first latching mechanism and a second aperture adjacent the second latching mechanism;
wherein the bin has a first extension and a second extension configured to extend through the first aperture and the second aperture, respectively, when the lid is in the closed position; and
wherein the first latching mechanism releasably latches to the first extension and the second latching mechanism releasable latches to the second extension.

7. The assembly of claim 1, wherein the lid has a first end adjacent the single cross bar and a second end opposite from the first end; and further comprising:
a liner connected to the bin adjacent the second end; and
wherein an area between the liner and the lid is unobstructed.

8. The assembly of claim 7, further comprising:
an inductive coil charger module operatively connected to the bin under the liner.

9. The assembly of claim 7, further comprising:
an accessory device module secured to the bin and having at least one of an auxiliary device port, a USB port, and a scan disk port.

10. An assembly for a vehicle comprising:
a bin defining a storage compartment and an access opening;
a lid configured to at least partially cover the access opening when the lid is in a closed position;
a cross bar pivotably secured to the bin to partially define a first pivot axis and pivotably secured to the lid to partially define a second pivot axis spaced from the first pivot axis;
a first latching assembly releasably latching the lid to the bin and to the cross bar so that the lid is pivotable relative to the cross bar and the bin in a first direction about the second pivot axis from the closed position to a first open position when the first latching assembly is released;
a second latching assembly releasably latching the lid only to the bin so that the lid and the cross bar are pivotable in unison relative to the bin in a second direction opposite to the first direction about the first pivot axis from the closed position to a second open position when the second latching assembly is released; wherein the lid at least partially uncovers the access opening in the first open position and in the second open position; wherein the cross bar is entirely outside of a perimeter of the access opening regardless of whether the lid is in the closed position, the first open position, or the second open position;
a first biasing mechanism biasing the lid to the first open position; and
a second biasing mechanism biasing the lid to the second open position.

11. The assembly of claim 10, wherein the first biasing mechanism is a first torsion spring operatively secured to the cross bar and the lid; wherein the second biasing mechanism is a second torsion spring operatively secured to the cross bar and to the bin.

12. The assembly of claim 10, wherein the first latching mechanism has:
a first latch member slidably fixed to the lid and releasably latched to the bin;
a second latch member slidably fixed to the lid and releasably latched the cross bar;
a first striker engaged with the first latch member and with the second latch member and movable to simultaneously release the first and the second latch members from the bin and the cross bar, respectively;
wherein the second latching mechanism has:
a third latch member slidably fixed to the lid and releasably latched to the bin;
a fourth latch member slidably fixed to the lid and releasably latched to the bin; and
a second striker engaged with the third latch member and with the fourth latch member and movable to simultaneously release the third and the fourth latch members from the bin.

13. The assembly of claim 12, wherein the first striker has angled slots; and wherein the first latch member and the second latch member move relative to one another in the angled slots when the first striker is moved.

14. The assembly of claim 12, wherein the first striker is configured to interfere with movement of the second striker when the first striker is moved; and
wherein the second striker is configured to interfere with movement of the first striker when the second striker is moved, the first latching mechanism and the second latching mechanism thereby being releasable only one at a time.

15. The assembly of claim 10, wherein the lid has a first aperture adjacent the first latching mechanism and a second aperture adjacent the second latching mechanism;
wherein the bin has a first extension and a second extension configured to extend through the first aperture and the second aperture, respectively, when the lid is in the closed position; and
wherein the first latch mechanism releasably latches to the first extension and the second latching mechanism releasable latches to the second extension.

16. The assembly of claim 10, wherein the lid has a first end adjacent the cross bar and a second end opposite from the first end; and further comprising:
a liner connected to the bin adjacent the second end; and
wherein an area between the liner and the lid is unobstructed.

17. The assembly of claim 16, further comprising:
an inductive coil charger module operatively connected to the bin under the liner.

18. The assembly of claim 16, further comprising:
an accessory device module secured to the bin and having at least one of an auxiliary device port, a USB port, and a scan disk port.

19. A vehicle comprising:
a first seat and a second seat;
an armrest assembly between the first seat and the second seat, the armrest assembly including:
  a bin defining a storage compartment with an access opening and a support surface forward of the access opening;
  only a single cross bar;
  a lid releasably latched to the bin and to the single cross bar and configured to cover the access opening in a closed position; wherein the single cross bar is pivotably attached to the bin near one end, pivotably attached to the lid near another end, and extends laterally across the bin rearward of the storage compartment;
  a first latching assembly releasably latching the lid to the bin and to the single cross bar so that the lid is pivotable relative to the single cross bar and the bin in a first direction about the second pivot axis from the closed position to a first open position when the first latching assembly is released;
  a second latching assembly releasably latching the lid only to the bin so that the lid and the single cross bar are pivotable in unison relative to the bin in a second direction opposite to the first direction about the first pivot axis from the closed position to the second open position when the second latching assembly is released; wherein the lid at least partially uncovers the access opening in the first open position and in the second open position;
wherein the lid is pivotably biased toward the first seat to the first open position, and is pivotably biased toward the second seat to the second open position;
  wherein the bin extends at least partially forward of and under the lid to define a slot between the lid and the support surface; and wherein the slot extends into the storage compartment and is unobstructed.

20. The vehicle of claim 19,
wherein the first latching mechanism has:
  a first latch member slidably fixed to the lid and releasably latched to the bin;
  a second latch member slidably fixed to the lid and releasably latched to the single cross bar; and
  a first striker engaged with the first latch member and with the second latch member and movable to simultaneously release the first and the second latch members from the bin and the single cross bar, respectively;
wherein the second latching mechanism has:
  a third latch member slidably fixed to the lid and releasably latched to the bin;
  a fourth latch member slidably fixed to the lid and releasably latched to the bin; and
  a second striker engaged with the third latch member and with the fourth latch member and movable to simultaneously release the third and the fourth latch members from the bin.

* * * * *